(12) United States Patent
Takatsu

(10) Patent No.: US 6,482,140 B1
(45) Date of Patent: Nov. 19, 2002

(54) ROLLER AND METHOD OF PRODUCING THE SAME

(75) Inventor: Shigeru Takatsu, Tokyo (JP)

(73) Assignee: Tashico Corporation, Tokyo (JP)

( * ) Notice: Subject to any disclaimer, the term of this patent is extended or adjusted under 35 U.S.C. 154(b) by 0 days.

(21) Appl. No.: 09/609,694

(22) Filed: Jul. 6, 2000

Related U.S. Application Data

(63) Continuation-in-part of application No. 09/456,511, filed on Dec. 8, 1999.

(51) Int. Cl.[7] .................................................. B21B 1/40
(52) U.S. Cl. ............................ 492/31; 492/35; 492/36; 492/49; 152/393; 301/5.306; 301/5.308; 384/449; 384/543
(58) Field of Search .............................. 492/30, 28, 31, 492/35, 36, 49; 301/5.301, 5.7, 5.304, 5.306, 5.307, 5.308; 152/393, 394, 323; 384/58, 449, 536, 543, 546, 547, 549, 582, 585, 586–588

(56) References Cited

U.S. PATENT DOCUMENTS

| | | | | |
|---|---|---|---|---|
| 2,230,744 A | * | 2/1941 | Disbro | |
| 3,103,387 A | * | 9/1963 | Saxenberg | |
| 3,604,545 A | * | 9/1971 | Bourgeois | |
| 3,807,817 A | * | 4/1974 | Black | |
| 3,860,293 A | * | 1/1975 | Labeda | |
| 4,019,789 A | * | 4/1977 | Rosin et al. | |
| 4,219,240 A | * | 8/1980 | Brandenstein et al. | |
| 4,291,438 A | * | 9/1981 | Seiki et al. | |
| 4,403,812 A | * | 9/1983 | Stephan | |
| 4,602,875 A | * | 7/1986 | Doerr et al. | |
| 4,708,498 A | * | 11/1987 | Labedan et al. | |
| 5,096,407 A | * | 3/1992 | Nebeling | |
| 5,527,050 A | * | 6/1996 | Szendel | |
| 5,630,891 A | * | 5/1997 | Peterson et al. | |
| 5,660,447 A | * | 8/1997 | Angelici | |
| 5,690,395 A | * | 11/1997 | Hicks | |
| 5,692,809 A | * | 12/1997 | Hook | |
| 5,988,656 A | * | 11/1999 | Krah | |
| 6,227,622 B1 | * | 5/2001 | Roderick et al. | |

* cited by examiner

Primary Examiner—David P. Bryant
Assistant Examiner—T. Nguyen
(74) Attorney, Agent, or Firm—Armstrong, Westerman & Hattori, LLP

(57) ABSTRACT

A roller is structured so that one or a plurality of grooves are recessed on an outer peripheral surface of an outer race in a bearing, a part of a synthetic resin tire integrally adhered to the outer race of the bearing is inserted and welded within a groove on the outer peripheral surface of the outer race in the bearing, whereby a firmer adhesion force can be obtained. Accordingly, a more firmly adhered fitting body is prevented from being peeled off from the outer race of the bearing and the tire and the outer race of the bearing are prevented from separately racing even when the bearing is exposed to a heavy load and rotates at a high speed, that is, the roller is adhered so as to prevent the tire and the bearing from rotating relative to each other.

12 Claims, 19 Drawing Sheets

F I G. 22. [Table 1]

| | WELDING FORCE | | BONDING FORCE |
|---|---|---|---|
| 1 | No welding | 1 | Peel with no resistance |
| 2 | 20% or more welding exists in outer peripheral width | 2 | 20% or more bonding exists in peeling primary resin |
| 3 | 50% or more welding exists in outer peripheral width | 3 | 20% or more bonding exists in peeling primary resin |
| 4 | 70% or more welding exists in outer peripheral width | 4 | 20% or more bonding exists in peeling primary resin |
| 5 | 100% or more welding exists in outer peripheral width | 5 | 100% or more bonding exists in peeling primary resin |

(Table 2)

(Table 3)

(Table 4)

(Table 5)

ROLLER AND METHOD OF PRODUCING THE SAME

This is a continuation-in-part of application Ser. No. 09/456,511 filed Dec. 8, 1999.

BACKGROUND OF THE INVENTION

1. Field of the Invention

The present invention relates to a roller which is exposed to a very heavy load, is required to have a suitable elastic force and abrasion resistance, and is structured so as to mount a tire for a high speed rotation and a heavy load, such as in an escalator, a moving walkway and the like, in which safety is highest priority, and particularly to a roller mounted so that the tire and the bearing do not skip even when the heavy load is applied at a time of starting the rotation and by a sudden stop, and a method of producing the same.

2. Prior Art

This kind of conventional roller is used on a rotating portion which rotates at a high speed, is exposed to a heavy load, is required to have a suitable elastic force and abrasion resistance, and ensures safety with the highest priority in environments such as transfer rollers, elevators, guide rollers, escalators, moving walkways, and the like, when mounting a synthetic resin tire. The roller of this kind is structured so that a synthetic resin tire is integrally adhered to a smooth outer peripheral surface of an outer race in the bearing. Further, the tire provided in this kind of bearing is required to have an abrasion resistance and a suitable elastic force together with a resistance against high speed rotation and a heavy load. The roller, which is structured so that the synthetic resin tire used in the rotating portion in which safety is required as the highest priority, is mounted to the bearing, is formed in such a manner that the tire adhered to the outer race of the bearing in a surrounding manner is formed in two layers, a tire outer peripheral portion made of a soft synthetic resin to meet a requirement of the abrasion resistance and the elastic force, and a tire base or inner portion directly adhered to the outer race of the bearing made of a hard synthetic resin to bear a resistance against the high speed rotation and the heavy load. There is suggested a roller which is structured so that the synthetic resin tire integrally adhered to the bearing in a surrounding manner is constituted by having two layers, hard and soft, respectively, a synthetic resin tire, and a method of producing the same.

Conventionally, in this kind of roller structured so that the synthetic resin tire is adhered to the outer race of the bearing, the synthetic resin tire used as the tire is integrally adhered to the outer race of the bearing in a surrounding manner. This conventional roller as used for elevators, escalators, transfer rollers, guide rollers, moving walkways, and the like, rotates at a high speed, is exposed to a heavy load, is used under very severe conditions, is required to have a suitable elastic force and an abrasion resistance in accordance with its use, and is required to ensure safety as the highest priority. Accordingly, in order to obtain a stronger adhesion, there is suggested a structure made such that the outer race of the bearing and the synthetic resin tire are integrally bridge-welded by cooling and hardening the synthetic resin temporarily thermally dissolved on an outer peripheral surface of the outer race, in place of simply bonding them by applying an adhesive material.

Further, in order to ensure that the tire adhered to the outer peripheral surface of the outer race in the bearing is integrally adhered to the outer race of the bearing in a stronger manner, there is suggested a roller structured such that the tire is constituted by two layers comprising a soft synthetic resin and a hard synthetic resin, an inner tire made of the hard synthetic resin, which is directly adhered to the outer peripheral surface of the outer race in the bearing so as to obtain a stronger adhesion force, and an outer tire made of the soft synthetic resin, which is adhered in such a manner as to overlap with the hard synthetic resin inner tire, whereby the tire having two layers is adhered to the outer peripheral surface of the outer race of the bearing in a stronger manner.

Further, in the roller to which this kind of synthetic resin tire is mounted, in order to integrally adhere the synthetic resin tire having the two, hard and soft layers to the outer race of the bearing, the tire has been produced by a method of integrally providing the soft resin tire outer peripheral portion on the outer peripheral surface of the hard synthetic resin tire base portion in a surrounding manner after adhering the hard synthetic resin tire base portion to the outer race of the bearing.

Further, in a method of producing a synthetic resin wheel, there is suggested a producing method comprising steps of forming a tire portion with a soft synthetic resin having a forming temperature lower than that of a wheel portion, and forming the wheel portion along an inner side of the tire portion with a hard synthetic resin having a forming temperature higher than that of the tire portion.

In this kind of conventional roller, the synthetic resin tire is integrally adhered to the outer peripheral surface of the outer race in the bearing. Further, since the outer peripheral surface of the outer race in this kind of bearing is formed into a smooth surface, a strong adhesion force above a certain level cannot be expected from the adhesive material between the synthetic resin tire adhered by the adhesive material or the like and the outer peripheral surface of the outer race. Accordingly, the synthetic resin tire integrally adhered to the outer race cannot stand against the heavy load and the high speed rotation over a certain level when being used in elevators, escalators and the like, so that the adhesion between the outer race and the tire is separated and the tire slips on the outer race of the bearing. In the worst case, there is a problem in that the tire is taken out from the outer race of the bearing so as to slip off.

Further, in order that the outer race of the bearing and the synthetic resin tire are more firmly adhered to each other, the structure is made so as to firmly adhere the synthetic resin tire on the outer peripheral surface of the outer race by cooling and hardening the temporarily dissolved synthetic resin on the outer race of the bearing, in place of simply applying the adhesive material. In this structure, in comparison with the structure simply bonded by an application of the adhesive material, a strong adhesion force can be obtained. However, in this kind of roller used in elevators, escalators, transfer rollers and the like, there is a possibility that a significantly heavy load is applied at a starting time or at a time of a sudden stop, and in severe using conditions, it is necessary to rapidly stop the high speed rotating roller at a time of high speed rotation, or a sudden stop is required. As a result, there is a problem in that the adhesion between the tire and the outer race of the bearing is damaged and peeled off during the use, so that the tire slips on the outer race and falls off from the outer race.

Further, in order that the tire adhered to the outer peripheral surface of the outer race in the bearing is integrally adhered to the outer race of the bearing in a stronger manner, the structure is made so that the tire is constituted by two layers comprising a soft synthetic resin and a hard synthetic resin, an inner tire made of the hard synthetic resin being directly adhered to the outer peripheral surface of the outer race in the bearing so as to obtain a stronger adhesion force, and an outer tire made of the soft synthetic resin being adhered in such a manner as to overlap with the hard synthetic resin inner tire, whereby the tire having two layers is adhered to the outer peripheral surface of the outer race of the bearing in a stronger manner. In this roller, in comparison with the structure made so as to integrally adhere the tire to the outer race by bonding the synthetic resin tire by an application of adhesive material or cooling and hardening the thermally dissolved synthetic resin on the outer race, a more firm adhesion force can be obtained. However, a load of some hundreds of kilograms per sq. cm. be applied, and a high speed rotation of some thousands per minute may be used. In such case, the adhesion between the tire and the outer race of the bearing is damaged, and the tire peels off during the use, so that there is a problem in that the tire races on the outer race and falls off from the outer race.

Further, in a conventional method of integrally providing the soft resin tire outer peripheral portion on the outer peripheral surface of the hard synthetic resin tire base portion in a surrounding manner after adhering the hard synthetic resin tire base portion to the outer race of the bearing, when the soft synthetic resin tire outer peripheral portion is adhered onto the outer peripheral surface of the tire base portion in a surrounding manner, since a sealing performance of the tire outer peripheral portion with respect to the tire base portion is deteriorated, it is necessary to firmly bond the tire outer peripheral portion to the tire base portion by the adhesive material. Accordingly, a step of uniformly applying the adhesive material to all the surface of the outer peripheral surface with respect to the tire base portion is required, and a problem is caused in that the roller itself is broken due to peeling off from the bonding portion when rotating at a high speed and under a heavy load in the case of bonding by the adhesive material. Further, there is problem in that a high level of skills required for uniformly applying the adhesive material on all the surface of the outer peripheral surface with respect to the tire base portion, so that a producing step is complex and a producing cost is increased.

Further, in the roller which is exposed to the heavy load and stopped for a sufficiently long time, such as in an escalator and the like, when using this kind of conventional roller to which the conventional soft synthetic resin tire is mounted, the synthetic resin tire cannot stand against the heavy load while the rotating operation of the roller is stopped, so that there is a problem in that the portion to which the load is applied is pressed, deformed and recessed (thus reaching a so-called abraded state) and an expansion is formed on the tire in front of and at the back of a rotating direction of the roller, thereby disturbing the rotation of the roller at the starting time.

Further, in the method of producing the synthetic resin wheel disclosed in Japanese Patent Laid-Open No. 297606/1994, which comprises the steps of forming a tire portion by a soft synthetic resin having a forming temperature lower than that of the wheel portion, and forming a wheel portion along the inner side of the tire portion by a hard synthetic resin having a forming temperature higher than that of the tire portion, since the tire portion is formed by the soft synthetic resin having the forming temperature lower than that of the wheel portion and the wheel portion is formed along the inner side of the tire portion by the hard synthetic resin having a forming temperature higher than that of the tire portion, it is excellent that the soft synthetic resin tire portion and the hard synthetic resin wheel portion are integrally welded without using the adhesive material. However, it is necessary to mount the metal bearing by bonding to the inner side of the wheel portion of the integrally welded tire portion and wheel portion. Accordingly, in this roller for an escalator and the like, which is mounted to a heavy load and high speed rotation, and in which the abrasion resistance and a certain elastic force are required, there is a problem in that the adhesion between the bearing and the wheel portion by the adhesive material is peeled off.

Further, in the method of producing the synthetic resin wheel disclosed in Japanese Patent Laid-Open No. 297606/1994, comprising the steps of forming a tire portion by a soft synthetic resin having a forming temperature lower than that of the wheel portion, and forming a wheel portion along the inner side of the tire portion by a hard synthetic resin having a forming temperature higher than that of the tire portion, since the wheel portion is integrally formed along the inner side of the tire portion and the bearing is later inserted and mounted to the wheel portion, the wheel portion cannot be integrally welded to the tire portion and the bearing at the same time, so that there is a problem in that a step for mounting and fixing the bearing to the wheel portion is required. Further, when it is intended to pour the hard synthetic resin having a forming temperature higher than that of the soft synthetic resin in the tire portion, so as to charge and integrally weld the bearing with the wheel portion at the same time as providing the wheel portion in the inner side of the tire portion, that is, for forming the wheel portion between the tire portion and the bearing by the method of producing the synthetic resin wheel disclosed in Japanese Patent Laid-Open No. 297606/1994, comprising the steps of forming a tire portion by a soft synthetic resin having a forming temperature lower than that of the wheel portion and forming a wheel portion along the inner side of the tire portion by a hard synthetic resin having a forming temperature higher than that of the tire portion, a gas is generated on a contact surface between the poured hard synthetic resin and the soft synthetic resin in the tire portion, and the tire portion and the wheel portion cannot be completely welded all over the surface due to the generated gas, that is only a part which is not influenced by the gas is welded, so that there is a problem in that the tire portion and the wheel portion are peeled off when used for escalator roller and the like, which rotates at a high speed and is exposed to a heavy load.

Further, in Japanese Patent Laid-Open No. 279244/1998, a roller is disclosed which comprises a bearing and a tire mounted on the roller and comprised of an inner portion and an outer portion. However, in this roller, the inner portion of the tire covers the outer peripheral surface of the bearing as well as partially the lateral sides adjacent to the outer peripheral surface. The outer portion of the tire covers the outer peripheral surface of the inner portion as well as completely the lateral sides of the inner portion. Thus, the inner portion is not exposed laterally, but is covered by the outer portion. In a method of producing this roller, the inner portion must be provided first, and then the outer portion is provided on the inner portion.

SUMMARY OF THE INVENTION

An object of the present invention is to solve the technical problem of this kind of conventional roller structured so as to integrally adhere the synthetic resin tire to the outer race of the bearing.

According to a first aspect of the present invention, a roller includes a bearing having an inner race and an outer race, a tire mounted on the outer race, and means for engaging the tire with the outer race, wherein the tire is integrally welded to an outer peripheral surface of the outer race, whereby the tire is immovably fixed to the bearing.

According to a second aspect of the present invention, a roller includes a bearing having an inner race and an outer race, and a tire mounted on the outer race, wherein the outer race of the bearing is formed to have an uneven outer peripheral surface, and wherein the tire is integrally welded to the uneven outer peripheral surface of the outer race, whereby the tire is immovably fixed to the bearing.

It is preferable that the tire includes a tire base or inner portion made of a hard synthetic resin and a tire outer peripheral portion made of a soft synthetic resin, wherein an outer peripheral surface of the tire base portion is formed to have a concave cross-sectional shape, and wherein the outer peripheral portion of the tire base portion is welded to an inner peripheral surface of the tire outer peripheral portion.

The uneven outer peripheral surface of the outer race may include a flat outer peripheral surface and one or a plurality of grooves formed thereon.

The uneven outer peripheral surface of the outer race may include a flat outer peripheral surface and one or a plurality of protrusions formed thereon.

The uneven outer peripheral surface of the outer race may include a flat outer peripheral surface and a plurality of grooves formed thereon, and the plurality of grooves may be spaced in parallel to each other and extend in an axial direction of the bearing.

In the alternative, the plurality of grooves may be spaced in parallel to each other and extend in a spiral manner in an axial direction of the bearing; or the plurality of grooves may extend in a spiral manner in an axial direction of the bearing so that the grooves cross each other on the outer peripheral surface of the outer race.

It is preferable that a thickness of the outer race is set to have a thickness obtained by adding a depth of the groove to a thickness of an outer race of a standard bearing in accordance with an international standard.

It is preferable that the inner race of the bearing has an end which protrudes from a side surface of the tire, or the inner race of the bearing has both ends which protrude from the respective side surfaces of the tire.

According to a third aspect of the present invention, a method of producing a roller comprising a bearing and a tire mounted on the bearing includes the steps of arranging the bearing concentrically in an inner space of a tire outer peripheral portion of a tire so as to form a gap therebetween, the tire outer peripheral portion being made of soft synthetic resin, and pouring a hard synthetic resin having a melting point higher than that of the soft synthetic resin into the gap to form the tire base portion, whereby said tire base portion is integrally welded to the bearing and the tire outer peripheral portion.

According to a forth aspect of the present invention, a method of producing a roller comprising a bearing and a tire mounted on the bearing includes the steps of arranging the bearing concentrically in an inner space of a tire outer peripheral portion of a tire so as to form a gap therebetween, the bearing including an outer race having an uneven outer peripheral surface, the tire outer peripheral portion being made of soft synthetic resin, and pouring a hard synthetic resin having a melting point higher than that of the soft synthetic resin into the gap to form the tire base portion, whereby said tire base portion is integrally welded to the bearing and the tire outer peripheral portion.

According to a fifth aspect of the present invention, a method of producing a roller comprising a bearing and a tire mounted on the bearing includes the steps of arranging the bearing concentrically in an inner space of a tire outer peripheral portion of a tire so as to form a gap therebetween, the bearing including an outer race having an uneven outer peripheral surface, the tire outer peripheral portion being made of soft synthetic resin having a melting point of 190° C., and pouring a hard synthetic resin having a melting point of 210° C. into the gap to form the tire base portion, whereby said tire base portion is integrally welded to the bearing and the tire outer peripheral portion.

According to a sixth aspect of the present invention, a method of producing a roller comprising a bearing and a tire mounted on the bearing includes the steps of arranging the bearing concentrically in an inner space of a tire outer peripheral portion of a tire so as to form a gap therebetween, the bearing including an outer race having an uneven outer peripheral surface, the tire outer peripheral portion being made of soft polyurethane rubber having a melting point of 190° C., and pouring a heated and melt thermoplastic hard urethane rubber having a melting point of 210° C. into the gap to form the tire base portion, so that a part of the soft polyurethane rubber on the surface of the tire outer peripheral portion is dissolved and mixed to the thermoplastic hard urethane rubber, whereby said tire base portion is integrally welded to the bearing and the tire outer peripheral portion.

The roller according to the present invention advantageously has an inner portion of the tire which is at least partially exposed on a side surface of the tire. For example, the outer portion of the tire is only welded to the outer peripheral surface of the inner portion.

In the roller according to the present invention, advantageously, the inner portion of the tire has an uneven outer peripheral surface, and/or the outer portion of the tire has an uneven inner peripheral surface, so that the inner portion and the outer portion of the tire are strongly welded to each other.

Other objects and advantages of the present invention will become apparent from the description of the preferred embodiments, which may be modified in any manner without departing from the scope and spirit of the present invention.

BRIEF DESCRIPTION OF THE DRAWINGS

FIG. 22 is a table corresponding to Table 1 which shows a peeling test result with respect to a roller to which a tire is mounted so as to prevent racing the roller having been produced in accordance with the present invention;

FIG. 26 is a graph corresponding to Table 5 which shows the result of a breaking test by a side load with respect to a roller to which a tire is mounted so as to prevent racing, the roller having been produced in accordance with the present invention.

DESCRIPTION OF THE PREFERRED EXAMPLES

Figure 1:
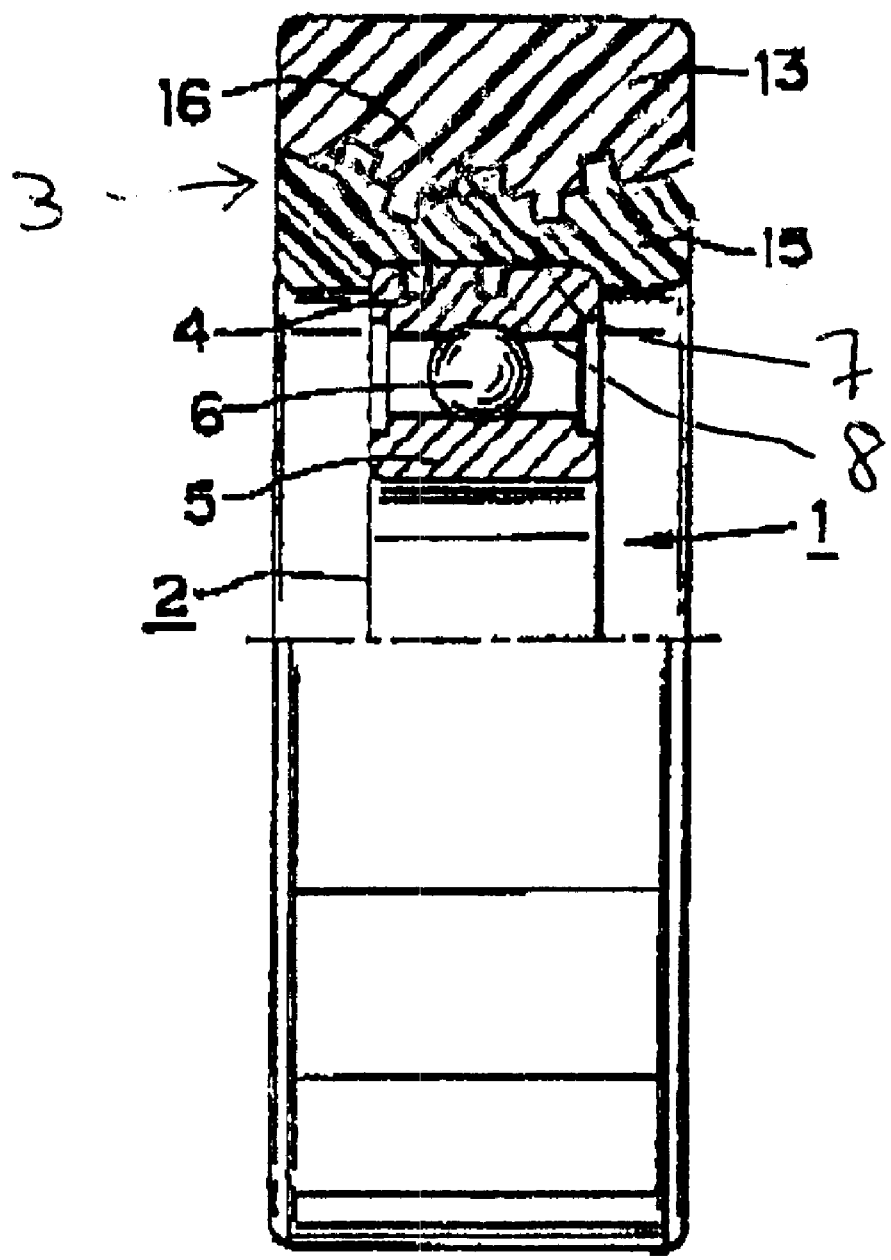
FIG. 1 is a partial cross sectional view of a roller according to a first embodiment of the present invention.
Figure 2:
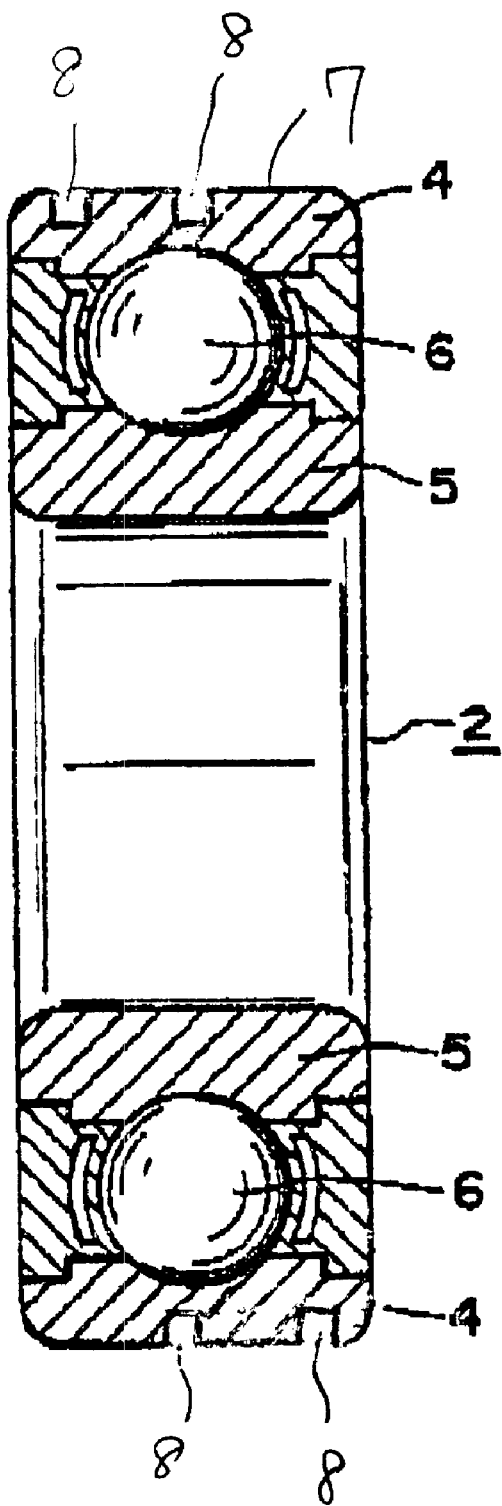
FIG. 2 is a cross sectional view of a bearing in accordance with the first embodiment.

Next, the present invention will be described below on the basis of examples, however, the examples do not limit the present invention.

A description will now be given below of an example in accordance with the present invention below with reference to FIGS. 1 to 21.

A roller 1 of the present invention is structured so that a synthetic resin tire 3 is integrally adhered to a bearing 2, the bearing 2 to which the tire 3 is mounted is made of metal and is rotatably structured such that concentrically circular ring shaped metal outer race 4 and inner race 5 hold a multiplicity of rotatable metal balls 6 therebetween, and the synthetic resin tire 3 is integrally welded and adhered on an outer peripheral surface 7 of the outer race 4 in the bearing 2. As mentioned above, the bearing 2 of the present invention is constituted by the outer race 4, the inner race 5, the ball 6 and the tire 3 integrally adhered on the outer peripheral surface 7 of the outer race 4. An outside diameter and a thickness of the bearing 2 is suitably selected in accordance with kind, size, weight, usage and a condition of a material to be transferred. For example, a width of the outer peripheral surface of the outer race 4 in the radial bearing 2 is set to a size obtained by adding 1 mm to an international standard size.

The tire 3 adhered to the metal bearing 2 is made of a polyurethane rubber synthetic resin, has the same width as the width of the outer peripheral surface of the bearing 2, and is structured for welding such that a part of the inner surface of the tire 3 is heated and thereafter cooled and hardened within a recess portion of a groove 8 recessed on an outer peripheral surface of the outer race 4 in a surrounding manner by completely inserting a part of a thermally dissolved polyurethane rubber synthetic resin into the groove portion of the groove 8. Thus, the bearing 2 and the tire 3 are firmly and integrally adhered.

In this case, the tire 3 integrally adhered to the metal bearing 2 is made of polyurethane rubber synthetic resin and the whole tire is formed by one layer made of a hard polyurethane rubber or a soft polyurethane rubber. However, the tire 3 may be, if necessary, formed by polyurethane synthetic rubber adhered directly to the outer peripheral surface of the outer race 4 of the bearing 2 and the whole tire 3 is formed by one layer of the hard polyurethane rubber or the soft polyurethane rubber, or polyurethane rubber adhered directly to the outer peripheral surface of the outer race 4 of the bearing 2 may be formed into an inner fitting body, if necessary, and an upper portion of the tire 3 made of the soft polyurethane rubber may be integrally adhered to the upper side of the inner tire 3 made of the hard polyurethane rubber, as a result of which the tire 3 has two layers, one layer made of the hard polyurethane rubber, and one layer made of the soft polyurethane rubber.

The groove 8 recessed on the outer peripheral surface of the outer race 4 of the metal bearing 2 is formed by bringing a bit of a cutting tool into contact with the outer race 4 of the bearing 2 mounted in such a manner as to be rotated by a lathe so as to cut, so that one or a plurality of grooves 8, which are spirally arranged or crossed or arranged in parallel, can be easily cut in such a manner as to have a desired depth and groove width.

A thickness of the outer race 4 of the metal bearing 2 is set by adding a depth of the groove portion of the groove 8 to a thickness of the outer race 4 of a so-called standard bearing in accordance with an international standard, which is generally produced and used on the basis of a standard united in accordance with an international standard in the technical field.

As mentioned above, since the outer race 4 is formed in the thickness obtained by adding the depth of the groove portion of the groove 8 to the thickness of the outer race 4 of the bearing 2 generally used as the standard bearing, a strength of the bearing 2 of the present invention is not decreased even when the groove 8 is recessed on the outer race 4 in a surrounding manner, and there is no risk that the tire 3 is peeled off and falls off due to an application of a horizontal load.

The outer peripheral surface 7 of the outer race 4 of the bearing 2 is formed in a smooth surface and the groove 8 has a depth of 0.5 mm and a width of 1.5 mm and is spirally recessed in a surrounding manner, and one groove or a plurality of the grooves are obliquely recessed at a fixed angle of incline with respect to an axial direction of the bearing 2 in a surrounding manner as occasion demands.

Figure 3:
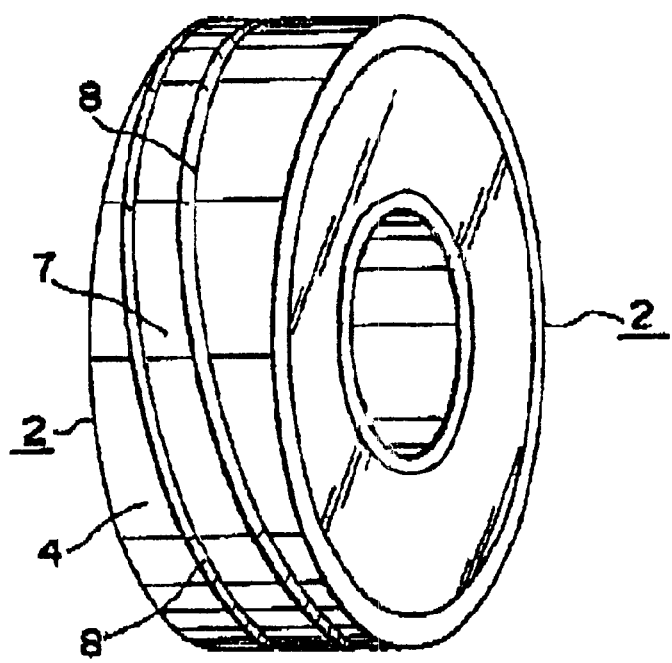
FIG. 3 is a perspective view of the bearing in accordance with the first embodiment.
Figure 4:
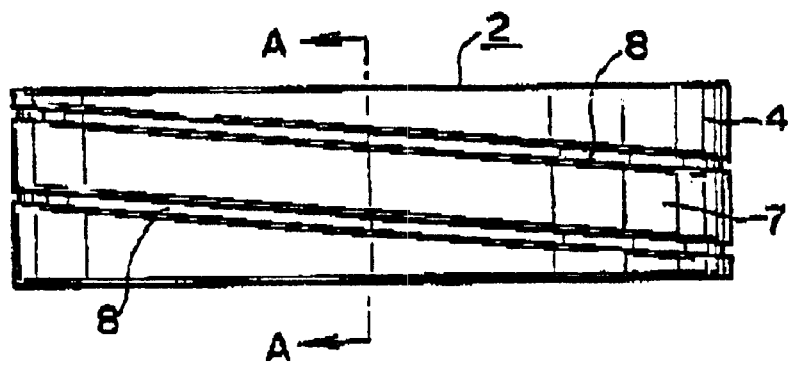
FIG. 4 is a plan view of the bearing in accordance with the first embodiment.

The groove 8 recessed on the outer peripheral surface 7 of the outer race 4 of the bearing 2 may be formed in one spiral shape as shown in FIGS. 3 and 4.

When the groove 8 is formed in one spiral shape provided on the outer peripheral surface 7 of the outer race 4, the groove 8 can be comparatively easier to cut on the groove 8 of the outer peripheral surface 7 of the bearing 2 by rotating the bearing 2 by means of the lathe, using the bit of the cutting tool.

Figure 6:
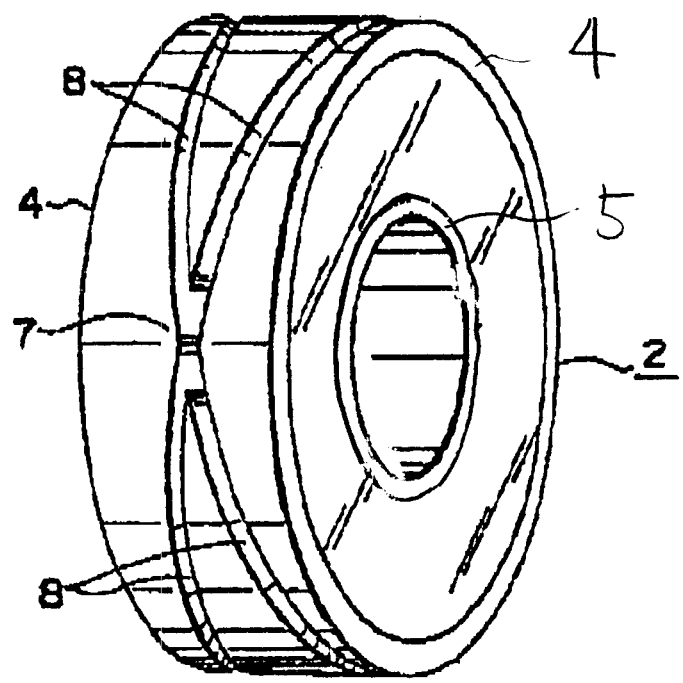
FIG. 6 is a perspective view of a bearing in accordance with a second embodiment of the present invention.
Figure 7:
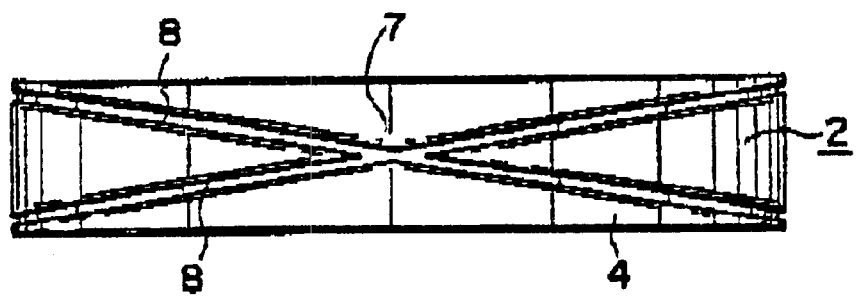
FIG. 7 is a plan view of the bearing shown in FIG. 6.

The groove 8 recessed on the outer peripheral surface 7 of the outer race 4 of the bearing 2 in a surrounding manner may be spirally formed in a surrounding manner so that two grooves 8 are obliquely provided at a fixed angle of incline with respect to an axial direction of the bearing 2 and mutually cross in a substantially center portion of the outer peripheral surface 7, as shown in FIGS. 6 and 7.

When the groove 8 is spirally provided in a surrounding manner on the outer peripheral surface 7 of the outer race 4 so as to cross each other, a bonding surface between the inner surface of the tire 3 and the groove 8 of the outer peripheral surface 7 of the bearing 2 becomes wider, and the groove 8 bonding the tire 3 to the outer peripheral surface 7 is uniformly provided on the outer peripheral surface 7 of the outer race 4, so that a more firm adhesion force between the tire 3 and the bearing 2 can be obtained.

Figure 8:
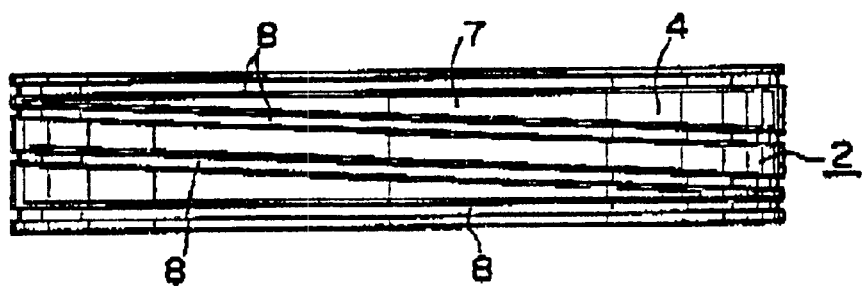
FIG. 8 is a plan view of a bearing according to a third embodiment of the present invention.
Figure 9:
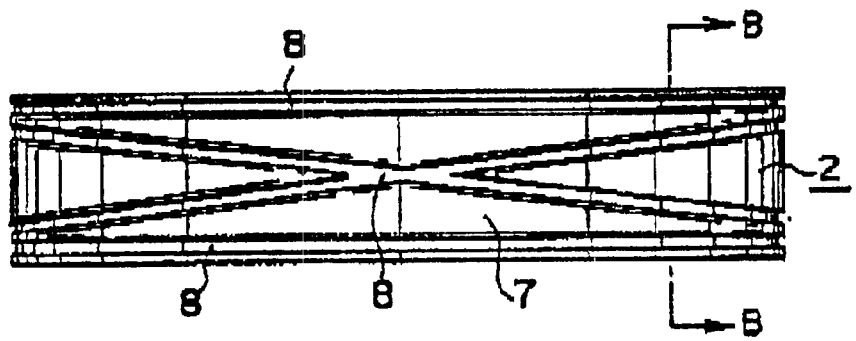
FIG. 9 is a plan view of a bearing according to a fourth embodiment of the present invention.

The groove 8 recessed on the outer peripheral surface 7 of the outer race 4 of the bearing 2 in a surrounding manner may be independently provided in parallel to a direction of both side lines of the outer race 4 in addition to the groove 8 recessed on the peripheral surface of the outer peripheral surface 7 of the outer race 4 in a surrounding manner, as shown in FIGS. 8 and 9.

When the groove 8 is independently provided in parallel to a direction of both side lines of the outer race 4 in addition to the groove 8 recessed on the peripheral surface of the outer peripheral surface 7 of the outer race 4 in a surrounding manner, a bonding surface with respect to the groove 8 on the inner surface of the tire 3 and the outer peripheral surface 7 of the bearing 2 is expanded, both side lines of the tire 3 are firmly adhered in the direction of both side lines of the outer race 4, and there is no risk that the tire 3 falls off.

Figure 5:
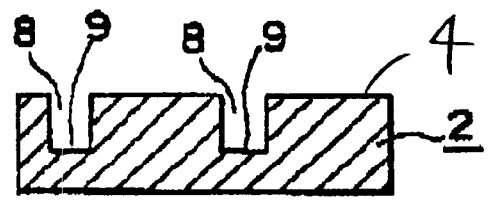
FIG. 5 is a cross sectional view taken along the line A—A in FIG. 4.
Figure 10:
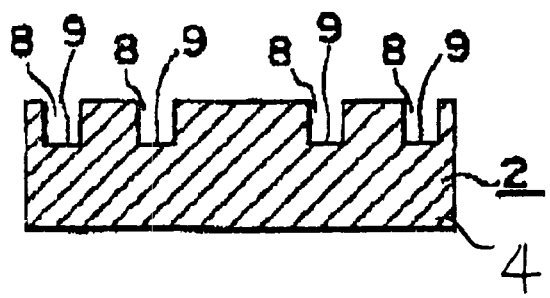
FIG. 10 is a cross sectional view taken along the line B—B in FIG. 9.
Figure 11:
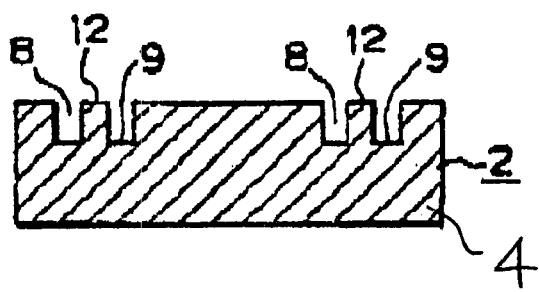
FIG. 11 is a cross sectional view of an outer race of a bearing according to a fifth embodiment of the present invention.
Figure 12:
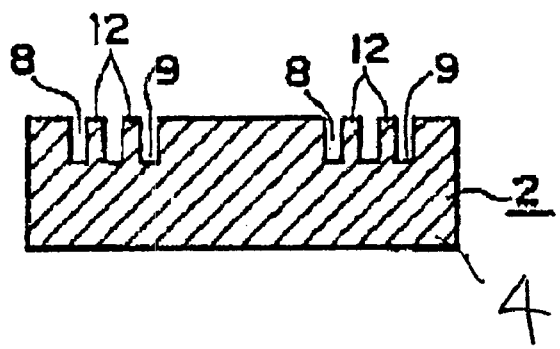
FIG. 12 is a cross sectional view of an outer race of a bearing according to a sixth embodiment of the present invention.

The groove 8 recessed on the outer peripheral surface 7 of the outer race 4 of the bearing 2 in a surrounding manner may be recessed so as to form a substantially U-shaped cross section, as shown in FIGS. 5 and 10 and one or two convex bodies 12 may be provided within the groove portion 9 of the groove 8 recessed in a substantially U-shaped cross section at a fixed interval in the same direction as that of the groove 8 in a surrounding manner as shown in FIGS. 11 and 12 as occasion demands.

When one or two convex bodies 12 are provided within the groove portion 9 of the groove 8 recessed in a substantially U-shaped cross section at a fixed interval in the same direction as that of the groove 8 in a surrounding manner, a bonding surface with respect to the groove 8 between the tire 3 inserted into the groove portion 9 of the groove 8 and the groove 8 is thereby expanded and a firmer adhesion force can be obtained.

Figure 13:
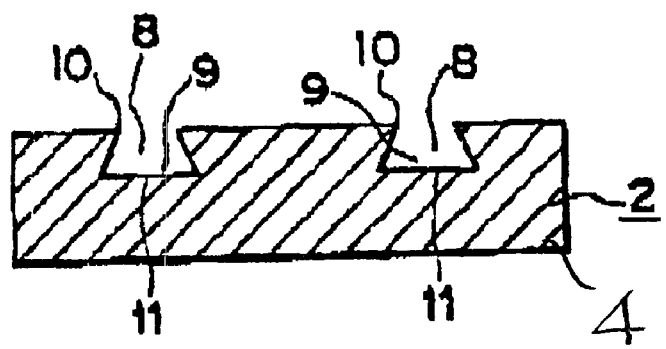
FIG. 13 is a cross sectional view of an outer race of a bearing according to a seventh embodiment of the present invention.

The groove portion 9 of the groove 8 recessed on the outer peripheral surface 7 of the outer race 4 of the bearing 2 may be recessed so as to form a substantially U-shaped cross section, and a groove bottom portion 11 of the substantially U-shaped groove portion 9 may be formed so as to form a substantially tapered cross sectional shape which is wider than that of a groove opening 10 as shown in FIG. 13.

When the groove bottom portion 11 of the groove portion 9 in the groove 8 is formed wider than that of the groove opening 10 so as to form a substantially tapered cross sectional shape, a part of the tire 3 is firmly inserted and adhered to the groove portion 9 of the groove 8 on the outer peripheral surface 7 of the outer race 4, so that the tire 3 and the bearing 2 are adhered by a firm adhesion force.

Figure 14:
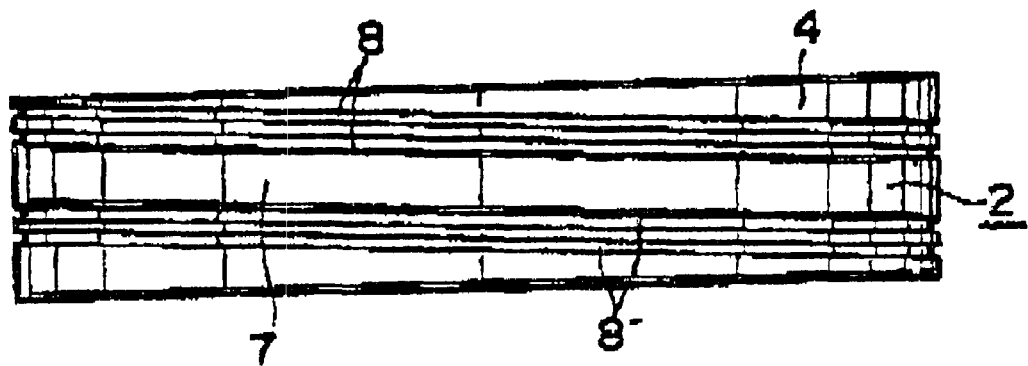
FIG. 14 is a plan view of a bearing according to an eighth embodiment of the present invention.

The groove 8 recessed on the outer peripheral surface 7 of the outer race 4 of the bearing 2 in a surrounding manner may be formed such that two grooves are spirally arranged in parallel in a surrounding manner as shown in FIG. 14.

When two grooves 8 are spirally provided on the outer peripheral surface 7 of the outer race 4 in a surrounding manner, the groove 8 can be cut and recessed on the outer peripheral surface 7 of the bearing 2 in a comparatively easier manner by rotating the bearing 2 by the lathe and placing the bits of two cutting tools in parallel. Further, an area of the groove 8 for adhering the tire 3 to the outer peripheral surface 7 of the outer race 4 is expanded, whereby a more firm adhesion force can be obtained.

A thickness of the outer race 4 of the bearing 2 may be formed by adding the depth of the groove portion 9 of the groove 8 to the thickness of the outer race of the standard bearing in accordance with the international standard.

When the thickness of the outer race 4 of the bearing 2 in accordance with the present invention corresponds to the thickness obtained by adding the depth of the groove portion 9 of the groove 8 to the thickness of the outer race of the standard bearing in accordance with the generally used international standard, in the bearing of the present invention, the strength thereof is not decreased even when recessing the groove 8 on the outer race 4, and the fitting body is not peeled off and does not fall off even when the horizontal load is applied.

When the roller in accordance with the present invention is structured such that one or a plurality of grooves having a fixed depth and width are recessed on the outer peripheral surface of the outer race of the bearing in a surrounding manner, a part of the synthetic resin tire integrally adhered to the outer peripheral surface of the outer race of the bearing is inserted and welded within the groove on the outer peripheral surface of the outer race in the bearing, so that the outer race of the bearing and the tire are integrally adhered so as to be more firmly adhered. Accordingly, the roller is not peeled off so that the tire and the outer race of the bearing do not slip relative to each other.

Figure 15:
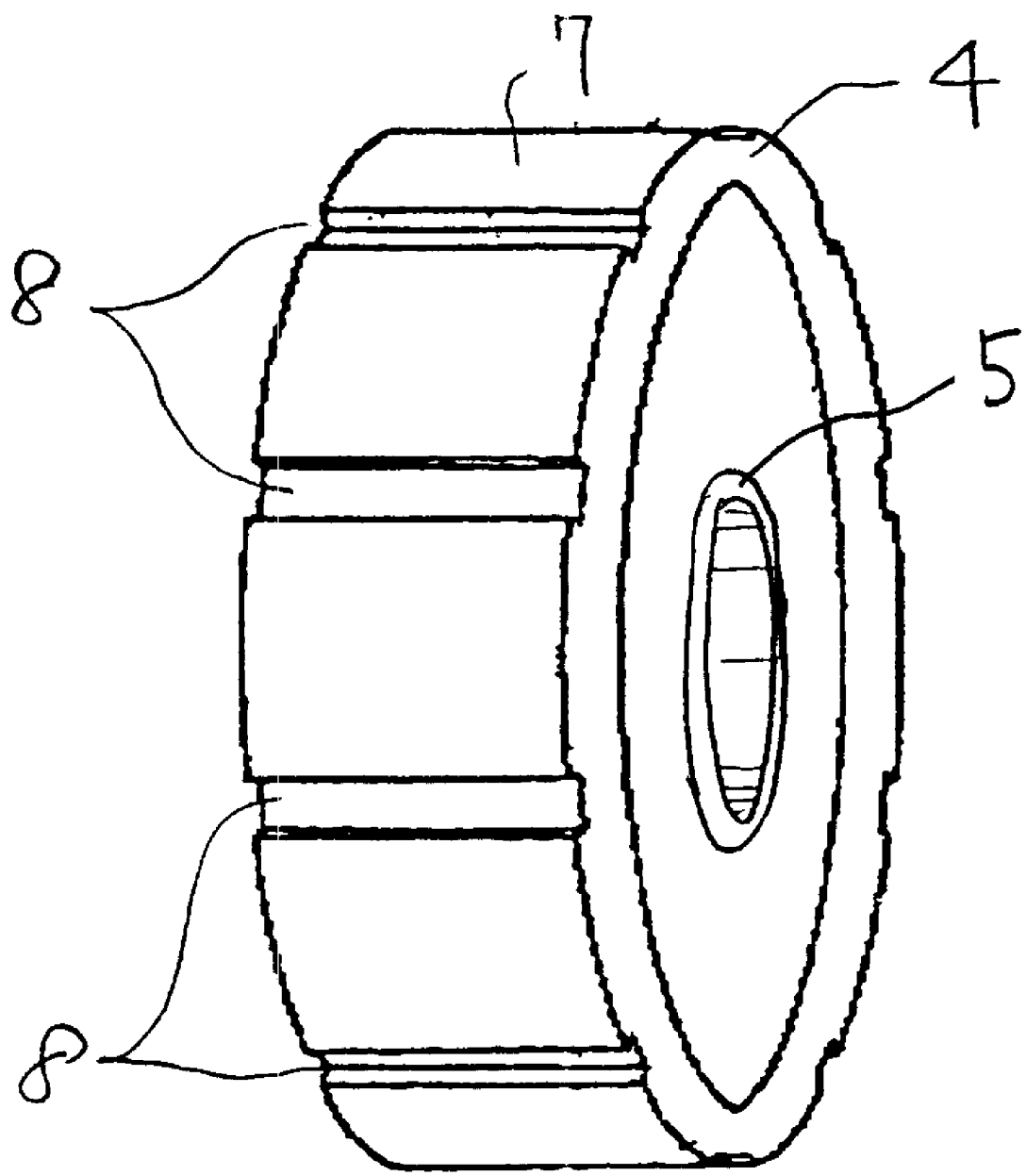
FIG. 15 is a perspective view of a bearing in accordance with a ninth embodiment of the present invention.

FIG. 15 shows another embodiment of a bearing 2. On the outer peripheral surface of the outer race 4, a plurality of grooves 8, each extending in the axial direction of the bearing 2, are formed parallel with each other. This uneven surface of the outer peripheral surface of the outer race 4 enhances the gripping force between the bearing and the tire.

Figure 16:
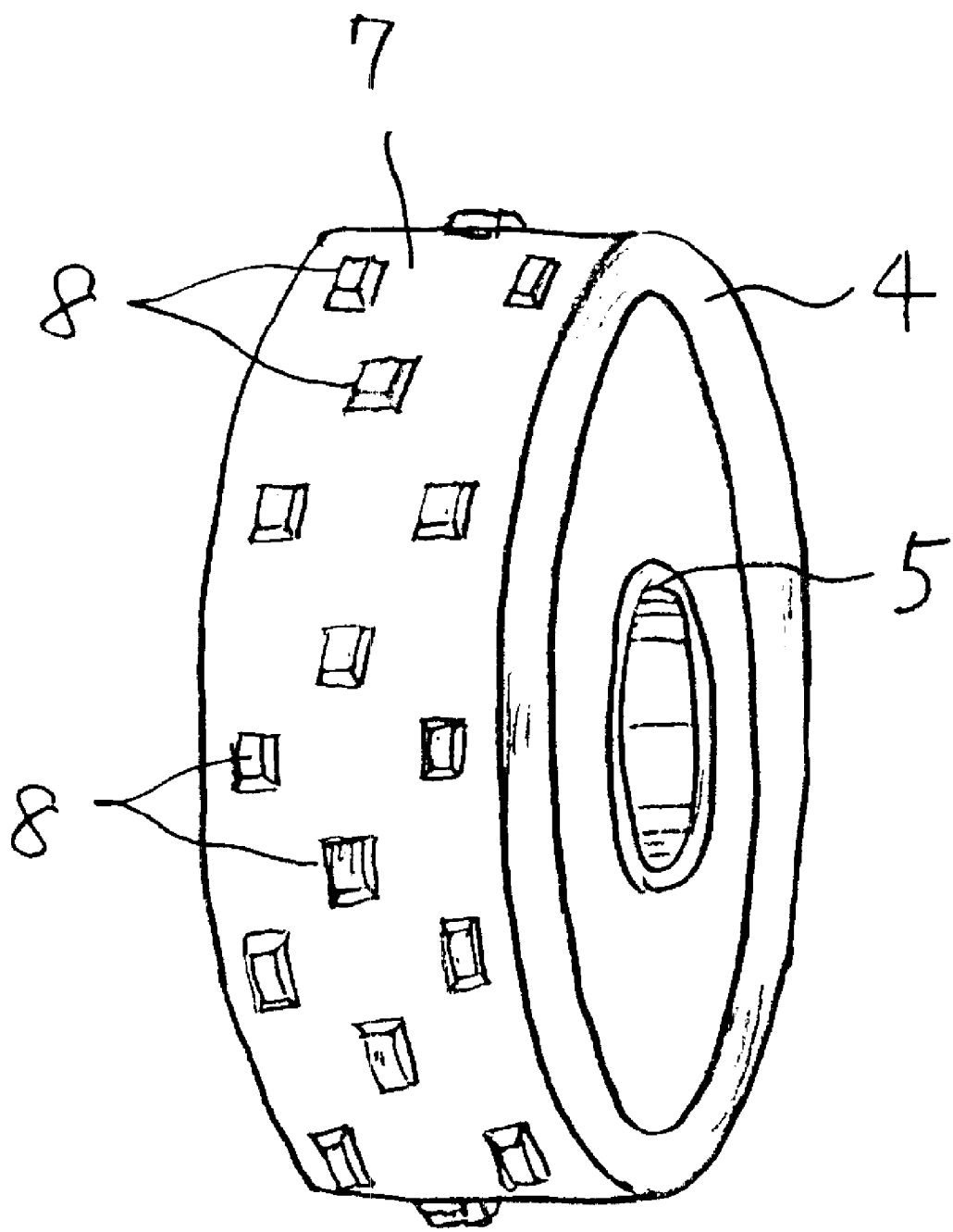
FIG. 16 is a perspective view of a bearing in accordance with a tenth embodiment of the present invention.
Figure 17:
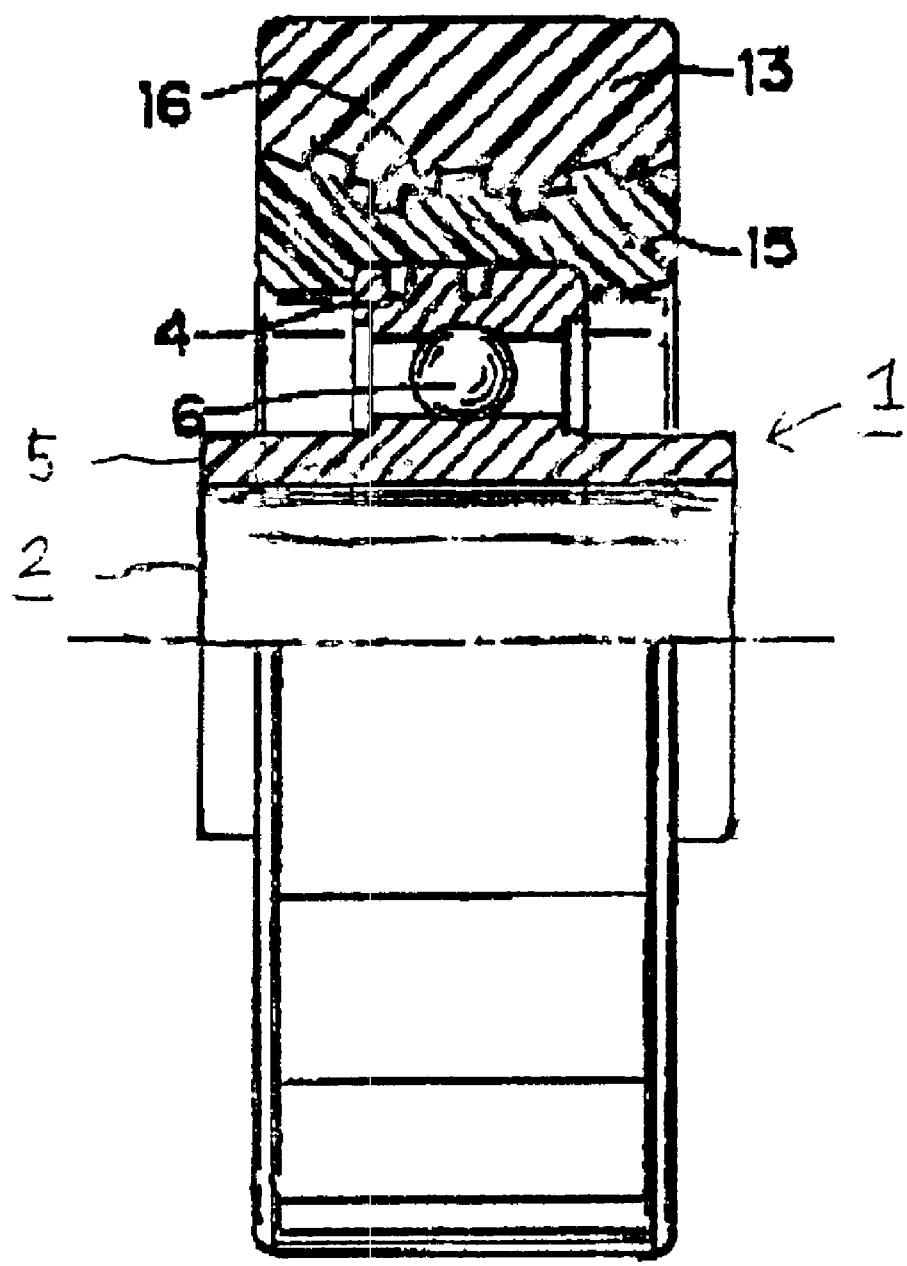
FIG. 17 is a partial cross sectional view of a roller according to an eleventh embodiment of the present invention.

FIG. 16 shows still another embodiment of a bearing 2. In this embodiment, a plurality of protrusions 8*d* are integrally formed on the outer peripheral surface of the outer race 4 of the bearing 2.

Figure 18:
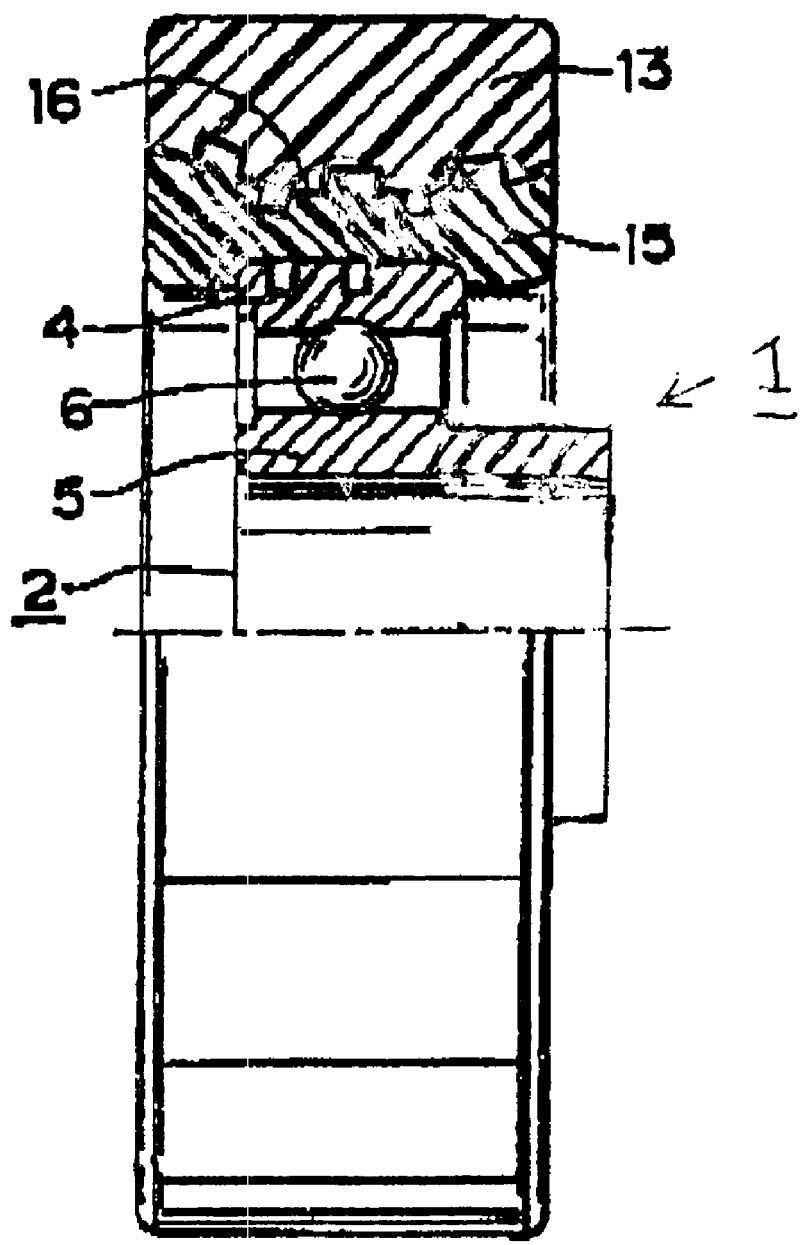
FIG. 18 is a partial cross sectional view of a roller according to a twelfth embodiment of the present invention.
Figure 19:
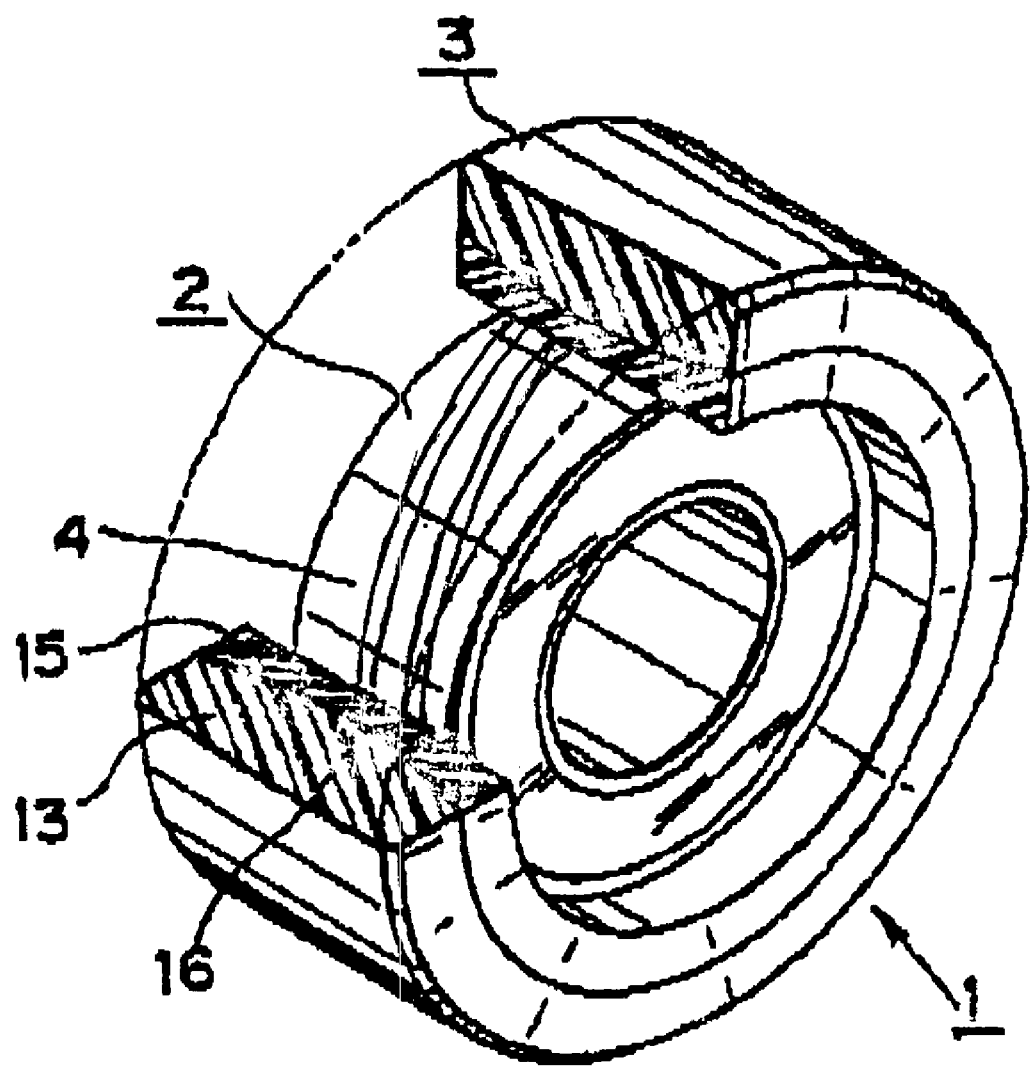
FIG. 19 is a partially broken perspective view of a roller according to the first embodiment.

FIG. 18 shows a modification of the first embodiment shown in FIG. 1. In this embodiment, the inner race 5 of the bearing 2 has ends which protrude from the side surfaces of the tire. This elongated inner race 5 enables an easy assembling of the roller to an object. Alternatively, as shown in FIG. 19, the inner race 5 of the bearing 2 may have one end which protrudes from the side surface of the tire. This also enables an easy assembling of the roller.

As shown in FIGS. 1, 18 and 19, the inner portion of the tire has an uneven outer peripheral surface, and/or the outer portion of the tire has an uneven inner peripheral surface, so that the inner portion and the outer portion of the tire are strongly welded to each other. For example, it is possible to provide the outer portion of the tire with an uneven inner peripheral surface such as ridges, asperities, grooves, or the like, and the inner portion of the tire is formed with complementary shapes on its outer peripheral surface which cooperate with the shapes on the inner peripheral surface of the outer portion. The same or similar uneven shapes, such as a groove or grooves, can be provided as the uneven shapes for the bearing shown in FIGS. 1 to 16.

Figure 20:
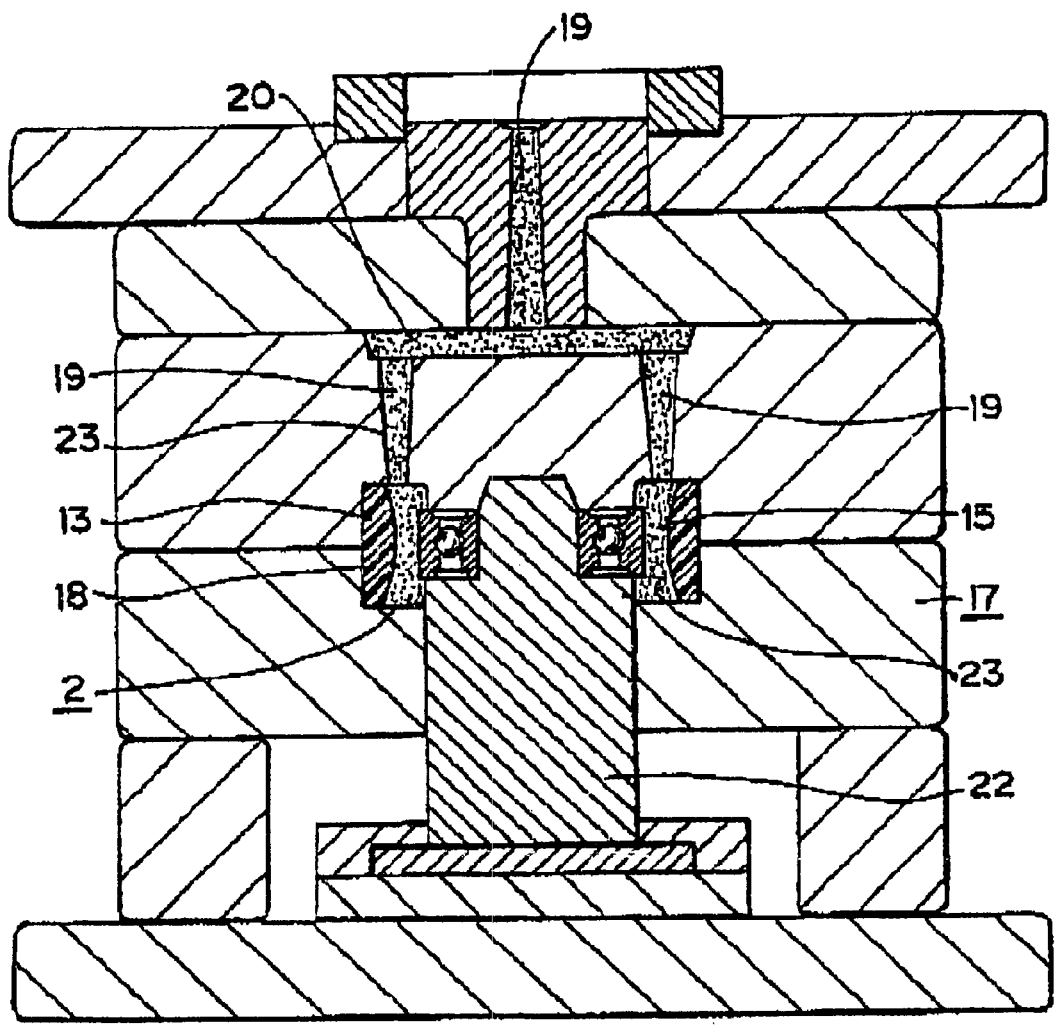
FIG. 20 is a cross sectional view for showing a step of producing a roller in accordance with the present invention.

It is also possible to provide the outer portion of the tire with an even or smooth, or even a smooth inner peripheral surface and/or to provide the inner portion of the tire with an even or smooth, or even and smooth outer peripheral surface, as shown on FIG. 20.

Next, a description will be given in detail of a method of producing a roller to which a tire is mounted so as to prevent racing in accordance with the present invention on the basis of the examples shown in FIGS. 1, 2, 19, 20 and 21.

FIG. 1 shows a roller 1 in which the tire 3 was obtained by overlaying a hard synthetic resin and a soft synthetic resin in accordance with a producing step of the producing method of the present invention. The roller 1, in which the tire 3 obtained by overlaying the hard synthetic resin and the soft synthetic resin is mounted, is produced by placing the roller 1 between the tire outer peripheral portion 13 made of the soft synthetic resin and the bearing 2 made of the metal at an interval 14 and pouring and charging the thermoplastic hard synthetic resin having a melting point higher than that of the soft synthetic resin in the tire outer peripheral portion 13 so as to form the tire base portion 15 integrally welded with each of the tire outer peripheral portion 13 and the bearing 2, as shown in FIGS. 20 and 21.

Figure 21:
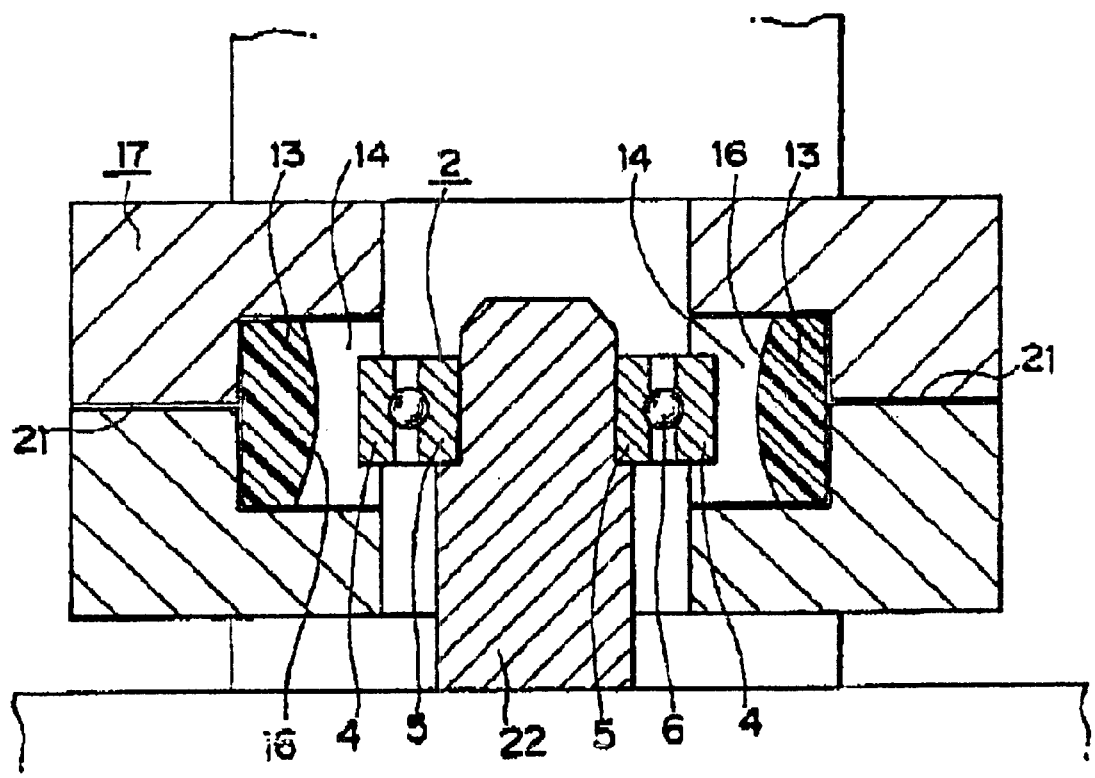
FIG. 21 is a cross sectional view which shows a main portion of a metal mold in FIG. 20.

Specifically, FIG. 21 shows a metal mold 17 which is mounted and fixed to an injection molding apparatus used for forming the roller 1 to which the tire 3 obtained by overlaying the hard synthetic resin and the soft synthetic resin is mounted, by the method of the present invention, and is used for dissolving from the injection molding apparatus, injecting, pouring, charging and forming.

In the present invention, the soft synthetic resin constituting the tire outer peripheral portion 13 has an abrasion resistance and a heat resistance, and further, has a flexibility and an elasticity, but lacks strength for a roller used in an escalator. The hard synthetic resin constituting the tire base portion 15 has a strength appropriate for a roller used in an escalator.

Further, in the example, soft polyurethane rubber is used for the soft synthetic resin. However, the soft synthetic resin is not limited to this example it is possible to use the other suitable soft elastomer and the like may be used, and.

Further, in the example of the present invention, thermoplastic hard polyurethane rubber is used for the hard synthetic resin. However, the hard synthetic resin is not limited to that example, and any other suitable plastomer such as a nylon may also be used.

Further, in order to mold the roller, to which the tire obtained by overlaying the hard synthetic resin and the soft synthetic resin is mounted, on the basis of the method of the present invention, it is possible to provide a step of degreasing an inner peripheral surface in an inner direction of the tire outer peripheral portion 13 in a normal way before forming the tire base portion 15 along the inner side of the tire outer peripheral portion 13. The degreasing step includes applying a primer in addition to sweeping fat and oil and dirt attached to the inner peripheral surface of the tire outer peripheral portion 13.

In order to mold the roller, to which the tire obtained by overlaying the hard synthetic resin and the soft synthetic resin is mounted in the method of the present invention, the hard synthetic resin having the melting point higher than the melting point of the soft synthetic resin in the tire outer peripheral portion 13 is poured and charged into the gap 14 and then the soft synthetic resin having the low melting point and disposed on a boundary surface of the circular arc-shaped inner peripheral surface 16 corresponding to the inner peripheral surface of the tire 13 is again melted so as to be mixed in a state of being integrally melted with the poured hard synthetic resin, and the tire base portion 15 and the tire outer peripheral portion 13 formed by cooling the hardening the hard synthetic resin are welded on the boundary surface in a completely inseparable state so as to be connected and adhered.

In order to mold the roller, to which the tire obtained by overlaying the hard synthetic resin and the soft synthetic resin is mounted, in the method of the present invention, the soft synthetic resin disposed in the circular arc inner peripheral surface 16 of the tire outer peripheral portion 13 is brought into contact with the dissolved hard synthetic resin and is again dissolved to generate a gas. However, since the generated gas moves along the circular arc-shaped inner peripheral surface 16 protruding from the inner peripheral surface in the inner direction of the tire outer peripheral portion 13 and is completely discharged outward, the boundary surface between the tire outer peripheral portion 2 and the tire base portion 15 are completely adhered.

In order to mold the roller, to which the tire obtained by overlaying the hard synthetic resin and the soft synthetic resin is mounted, in the method of the present invention, the melting point of the soft synthetic resin of the tire outer peripheral portion 13 may be set to 190° C. and the melting point of the hard synthetic resin forming the tire base portion 15 may be set to 210° C., a difference between the melting points is being set as small as 20° C. Accordingly, it is possible to set a generating amount of a gas generated by an additional dissolution of the soft synthetic resin on the circular arc-shaped inner peripheral surface 16 of the tire outer peripheral portion 13, which is caused by the contact of the dissolved hard synthetic resin due to the pouring of the hard synthetic resin poured and charged into the gap 14, to an amount as small as possible, and further, the again dissolved soft synthetic resin and the poured hard synthetic resin are mixed in a completely melting state, so that the tire outer peripheral portion 13 and the tire base portion 15 can be completely welded without using the adhesive material.

EXAMPLE 1

The tire outer peripheral portion 13 is formed by soft polyurethane rubber corresponding to one kind of the soft synthetic resin which has a melting point of 190° C. and has a high elasticity so as to have a ring shape of an outside diameter of 80 mm, an inside diameter of 64 mm and a thickness of 8 mm and protrude the inner peripheral surface in the inner direction thereof in the inner direction, thereby forming the circular arc-shaped inner peripheral surface 16 having a circular arc cross sectional shape.

The metal bearing 2 aligning the center point and having an outside diameter of 36 mm is arranged at a center position on the concentric circle within the ring-shaped tire outer peripheral portion 13 so as to form the annular gap 14 having a thickness of 14 mm between the tire outer peripheral portion 13 and the bearing 2.

Within the metal mold 17 structured so as to form a recessed cavity portion 18 in such a manner as to arrange the tire outer peripheral portion 13, the bearing 2 and the gap 14 at the center thereof in the same state as that arranged as mentioned above, the metal mold 17 structured so as to arrange the tire outer peripheral portion 13, the bearing 2 and the gap 14 at the center thereof within as shown in FIG. 22 is mounted and fixed to an injection molding apparatus, as shown in FIG. 21.

Next, in the polyurethane rubber belonging to the same kind as the soft polyurethane rubber to which the tire outer peripheral portion 13 is formed, the hard polyurethane rubber 23 which corresponds to one kind of the thermoplastic synthetic resin and which has the melting point of 210° C. is dissolved in a liquid state by the injection molding apparatus, poured into the cavity portion 18 from a spool 19 provided in the metal mold 17 through the nozzle and charged into the gap 14 provided in the middle between the tire outer peripheral portion 13 and the bearing 2 within the metal mold 17.

In the manner mentioned above, when the thermoplastic hard polyurethane rubber 23 charged into the gap 14 is cooled and hardened, and is completely welded to both of the tire outer peripheral portion 13 and the bearing 2 so as to be integrally adhered, the metal mold 17 is taken out to form the tire base portion 15, whereby the roller 1 structured so that the tire base portion 15 is integrally welded between the tire outer peripheral portion 13 and the bearing 2 is produced so as to mount the layered synthetic resin tire 3.

In this case, when pouring the hard polyurethane rubber 23 dissolved in a liquid manner due to heating into the gap 14 between the outer peripheral portion 13 and the bearing 2, the gap being provided in the metal mold 17, the soft polyurethane rubber of the circular arc-shaped inner peripheral surface 16 of the tire outer peripheral portion 13 brought into contact with the dissolved hard polyurethane rubber 23 is again dissolved so as to generate a gas. However, the generated gas moves along the circular arc-shaped inner peripheral surface 16 protruding from the inner peripheral surface in the inner direction of the tire outer peripheral portion 13, and is completely discharged outward from an air vent 21 provided on a separating surface of the split metal mold 17, whereby the boundary surface between the tire outer peripheral portion 13 and the tire base portion 15 is completely adhered.

Further, since the hard polyurethane rubber 23 poured into the gap 14 from the injection molding apparatus and dissolved in a liquid state has a melting point of 210° C. higher than the melting point of 190° C. in the soft polyurethane rubber on the boundary surface corresponding to the surface portion of the circular arc-shaped inner peripheral surface 16 corresponding to the inner peripheral surface of the tire outer peripheral portion 13, the soft polyurethane rubber is again melted due to the pouring of the hard polyurethane rubber 17, so as to be mixed in a state of integrally melted with the poured hard polyurethane rubber 23, and the tire base portion 15 and the tire outer peripheral portion 13 formed in accordance with a cooling and hardening operation of the hard polyurethane rubber 23 is completely melted in an integral and inseparable state, connected and adhered.

When the inner portion of the tire is at least partially exposed on a side surface of the tire, it is easier to form the inner portion of the tire after the outer portion of the tire has been provided inside the mold. In addition, the roller produced by this method is less bulky.

Peeling Test

As subjects for a peeling test, there are prepared the roller, to which the tire is mounted so as to prevent racing, produced in accordance with the producing method of the present invention, that is, the roller to which the tire obtained by overlaying the hard synthetic resin and the soft synthetic resin is mounted, which is used for an escalator and the like. The roller to which the tire obtained by overlaying the synthetic resin is mounted is structured so that the overlaying synthetic resin portion constituting the tire having a thickness of 22 mm is integrally adhered to the metal bearing having an outside diameter of 36 mm so as to form the roller having a total diameter of 80 mm. The tire portion formed into two layers by the synthetic resin is formed into the soft polyurethane rubber tire outer peripheral portion (a primary resin in the peeling test) having a hardness of 92 degrees in A scale (durometer hardness) and a thickness of 8 mm in the outer peripheral direction, and the hard polyurethane rubber tire base portion (a secondary resin in the peeling test) having a hardness of 70 degrees in D scale (durometer hardness) and a thickness of 14 mm in the inner direction of the tire portion. These portions are integrally welded in an inseparable state in two layers.

In this case, the peeling is estimated by a resistance when the primary resin and the secondary resin are forcibly peeled at five stages of numbers. In this case, since it is performed by hand-operated peeling, the estimation includes feeling estimation of the operator.

Test Results

The test results are reported in Table 1 of FIG. 22. A whitening exists on a secondary resin bonding surface. Since a primary resin and a secondary resin are firmly welded, a part of a secondary resin bonding surface is melted with a bonding surface of the primary resin.

Cutting Test

As subjects for a cutting test, there are prepared the roller, to which the tire is mounted so as to prevent racing, produced in accordance with the producing method of the present invention, that is, the roller to which the tire obtained by overlaying the hard synthetic resin and the soft synthetic resin is mounted, which is used for an escalator and the like. The roller to which the tire obtained by overlaying the synthetic resin is mounted is structured so that the overlaying synthetic resin portion constituting the tire having a thickness of 22 mm is integrally adhered to the metal bearing having an outside diameter of 36 mm, so as to form the roller having a total diameter of 80 mm. The tire portion formed into two layers by the synthetic resin is formed into the soft polyurethane rubber tire outer peripheral portion (a primary resin in the peeling test) having a hardness of 92 degrees in A scale and a thickness of 8 mm in the outer peripheral direction, and the hard polyurethane rubber tire base portion (a secondary resin in the peeling test) having a hardness of 70 degrees in D scale and a thickness of 14 mm in the inner direction of the tire portion. These portions are integrally welded in an inseparable state in two layers. The cutting test is applied only to the tire portion after the peeling test.

In this case, the cutting test method is applied onto a gate position line as the cutting place (confirmation whether or not a void exists).

Test Results

No void is generated on the cut surface and the welding is completely performed.

Breaking Test

A breaking test in accordance with a side load is performed with respect to the tire and the bearing (wheel) in the roller shown in the Example 1 molded on the basis of the method of the present invention. In this case, the breaking test is performed with respect to a roller in which two bearings are used.

As subjects for a breaking test, there are prepared the roller, to which the tire is mounted so as to prevent racing, produced in accordance with the producing method of the present invention, that is, the roller to which the tire obtained by overlaying the hard synthetic resin and the soft synthetic resin is mounted, which is used for an escalator and the like. The roller to which the tire obtained by overlaying the synthetic resin is mounted is structured so that the overlaying synthetic resin portion constituting the tire having a thickness of 14 mm is integrally adhered to the metal bearing (wheel) (product standard number 6202) having an outside diameter of 36 mm so as to form the roller having a total diameter of 80 mm. The tire portion formed into two layers by the synthetic resin is formed into the soft polyurethane rubber tire outer peripheral portion having a hardness of 92 degrees in A scale and a thickness of 8 mm in the outer peripheral direction, and the hard polyurethane rubber tire base portion having a hardness of 70 degrees in D scale and a thickness of 14 mm in the inner direction of the tire portion. These portions are integrally welded in an inseparable state in two layers. The tire breaking test with the side load is applied only to the tire portion of the roller formed in the above manner.

In this case, the breaking test is executed under a condition of a temperature of 22° C. and a humidity of 56% by using an autograph AG-50KNG.

Test Results

Figure 23:
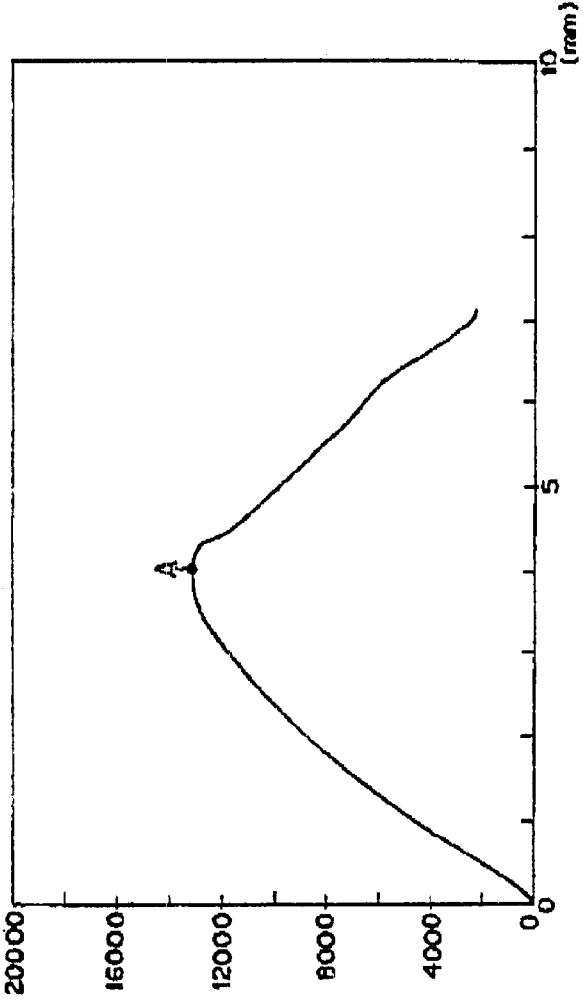
FIG. 23 is a graph corresponding to Table 2 which shows a cutting test result with respect to a roller to which a tire is mounted so as to prevent racing, the roller having been produced in accordance with the present invention.
Figure 24:
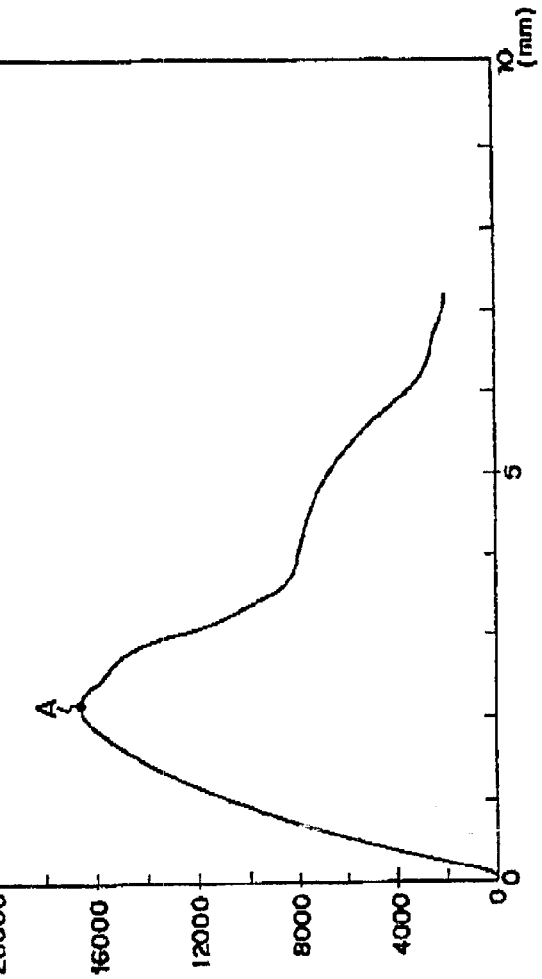
FIG. 24 is a graph corresponding to Table 3 which shows a cutting test result with respect to a roller to which a tire is mounted so as to prevent racing, the roller having been produced in accordance with the present invention.

Results of the breaking test are shown in Tables 2 and 3 of FIGS. 23 and 24 with respect to the breaking test with the side load.

That is, the tire in the roller in accordance with the present invention can stand against the great load such as 1339 Kg in the side load.

Further, the bearing (wheel) in the roller in accordance with the present invention can stand against the great load such as 1690 Kg in the side load.

Further, a static load in this kind of conventional standard radial bearing (the bearing in the same standard as the bearing in the Example 1 in accordance with the present invention) is 760 Kg, and further, it is known that the side load corresponds to 15% the static load 760 Kg, and the side load is set to be a standard value, so that it is 114 Kg.

Since the roller produced by the method of the present invention is structured such that the tire can stand against the side load of 1339 Kg and the bearing (wheel) can stand against the side load of 1690 Kg, it is possible to completely solve the problem that the roller resin molded to this kind of conventional bearing is weak against a thrust (side) load. Further, in the roller in accordance with the present invention, since the tire can stand against the 11 times or more thrust (side) load and the bearing (wheel) can stand against 14 times or more thrust (side) load in comparison with the conventional bearing, the roller made with resin molded to the bearing can be employed, whereas it cannot be used in conventional rollers due to weakness against the thrust (side) load. Accordingly, with the roller of the present invention, it is possible to stand against a very high radial (static) load and thrust (side) load, without fear of breaking a portion to which a high load is applied.

Comparative Example

A static load test is applied to the bearing employed for the roller to which the tire is mounted so as to prevent racing on the basis of Example 1, produced in accordance with the present invention, and a conventional bearing produced and used in accordance with JIS standard, and a comparison is performed.

In this case, subjects for the comparative test use a structure as in product standard number 6202. Further, the bearing (product standard number 6202-2RS) used for the roller to which the tire is mounted so as to prevent racing in accordance with the present invention, which is the subject for the comparative test, means that a radial bearing structured so that two grooves are cut on the outer race of the radial bearing is used.

Test Results

In this case, the comparative test is performed by the static load test under conditions of a temperature of 25 and a humidity of 42% with using an autograph AG-50KNG.

Figure 25:
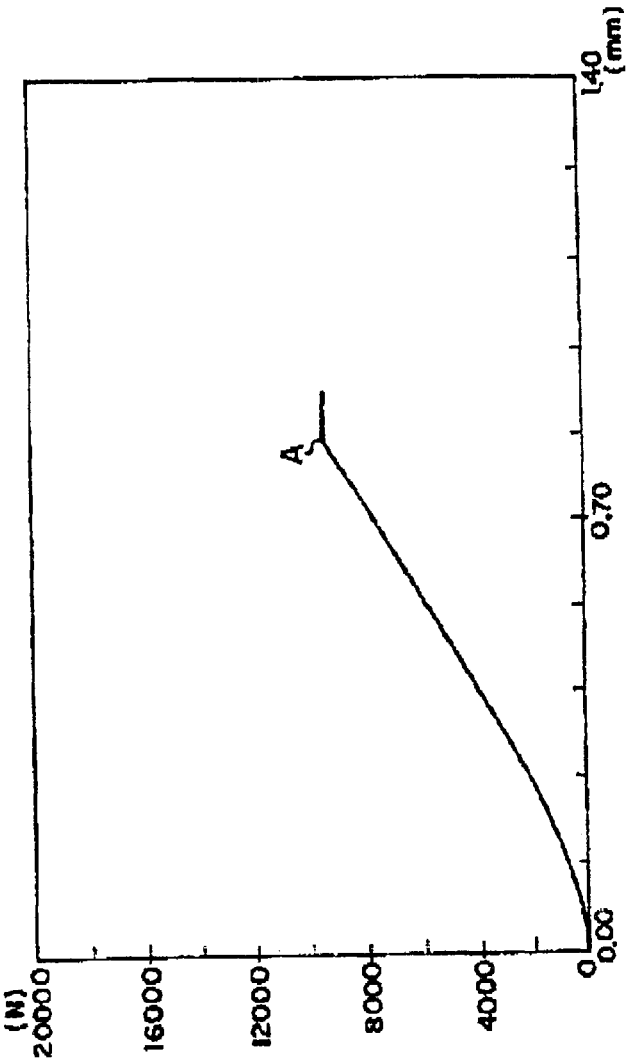
FIG. 25 is a graph corresponding to Table 4 which shows the result of a breaking test by a side load with respect to a roller to which a tire is mounted so as to prevent racing, the roller having been produced in accordance with the present invention.
Figure 2B:
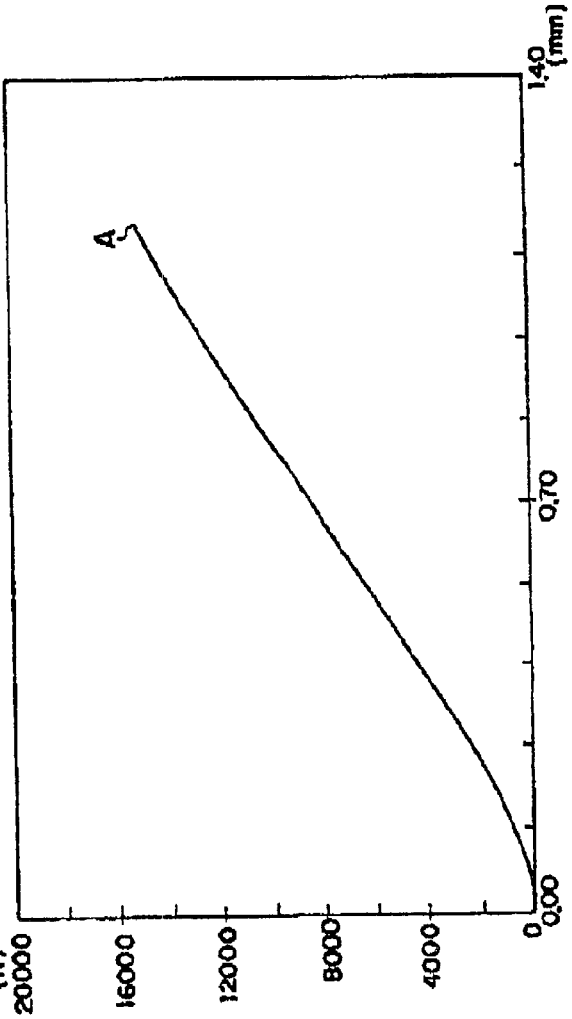

The results of the comparative test are shown in the graphs in Tables 4 and 5 on FIGS. 25 and 26 showing the static load test data. The load at the breaking point in the conventional bearing is 966 Kg, and that of the present invention is 1524 Kg, so that it becomes apparent that the present invention has a strength which can stand against a 1.5 times static load.

Effect of the Invention

Since the roller in accordance with the present invention is structured so that one or a plurality of grooves are recessed on the outer peripheral surface of the outer race in the bearing, a part of the synthetic tire integrally adhered to the outer race of the bearing is inserted and welded within the groove on the outer peripheral surface of the outer race in the bearing, whereby a firmer adhesion force can be obtained. Accordingly, the more firmly adhered fitting body is prevented from being peeled from the outer race of the bearing and the tire and the outer race of the bearing are prevented from separately racing even when the bearing is exposed to the heavy load and rotates at a high speed, that is, the roller is adhered so as to prevent the tire and bearing from rotating relative to each other.

The bearing in accordance with the present invention may be structured so that a plurality of grooves are spirally recessed in parallel on the outer peripheral surface of the outer race in the bearing in a surrounding manner, or a plurality of grooves are recessed in a direction perpendicular to an axial direction of the bearing and in parallel to each other in a surrounding manner, or a plurality of grooves are spirally recessed in a surrounding manner so that the grooves cross to each other on the outer peripheral surface of the outer race. In these cases, the area of the grooves which adheres the tire to the outer peripheral surface of the outer race is expanded to such a degree as to obtain the firmer adhesion force.

It is preferable that the bearing in accordance with the present invention is structured so that a thickness of the outer race of the bearing is set to the same thickness obtained by adding the depth of the groove portion of the groove to the thickness of the outer race of the standard bearing in accordance with the international standard. As mentioned above, since the thickness of the outer race of the bearing 1 in the present invention is set to the same thickness obtained by adding the depth of the groove portion of the groove to the thickness of the outer race of the standard bearing in accordance with the international standard which is generally used, in the bearing in the present invention, the strength of the outer race is not reduced even when the groove is recessed on the outer race in a surrounding manner, and there is no risk that the fitting body is peeled and falls off even when a horizontal load is applied.

The roller, to which the tire is mounted so as to prevent racing, is produced by the method comprising the steps of arranging the bearing having one or a plurality of grooves recessed on the outer peripheral surface of the outer race with providing the gap on the concentric circle inside the soft synthetic resin tire outer peripheral portion, and next pouring and charging the hard synthetic resin having the melting point higher than that of the soft synthetic resin in the tire outer peripheral portion into the gap formed between the tire outer peripheral portion and the outer race of the bearing so as to form the tire base portion, whereby the tire base portion is integrally welded to the bearing and the tire outer peripheral portion. Accordingly, the hard synthetic resin for the tire base portion having the melting point higher than the tire outer peripheral portion is poured and charged, whereby a part of the soft synthetic resin in the tire outer peripheral portion corresponding to the contact surface with the poured hard synthetic resin in the tire base portion is again melted and both resins are mixed to each other on the boundary surface so as to be hardened. Therefore, there is an effect that the firm adhesion force can be obtained, and the tire outer peripheral portion and the outer race are firmly and in an interlinking manner connected by the hard synthetic resin tire base portion which is charged into one or a plurality of grooves recessed on the outer peripheral surface of the outer race in the bearing so as to be hardened.

It is preferable that the melting point of the soft synthetic resin in the tire outer peripheral portion is set to 190° C., the melting point of the hard synthetic resin in the tire base portion is set to 210° C., and the temperature difference is set to a comparatively small value 20° C. In this case, the tire outer peripheral portion and the tire base portion can be integrally welded by pouring and charging the hard synthetic resin forming the tire base portion into the gap so as to easily again melt the soft synthetic resin on the inner peripheral surface of the tire outer peripheral portion. Therefore, the soft synthetic resin is mixed with the hard synthetic resin so as to form the tire base portion. As a result, the tire outer peripheral portion and the tire base portion can be integrally welded and an amount of the gas generated when the soft synthetic resin is again melted can be restricted to be as small as possible.

The tire base portion is preferably formed by the hard polyurethane rubber which corresponds to the thermoplastic synthetic resin belonging to the same group as that of the soft polyurethane rubber for forming the tire outer peripheral portion and has a melting point of 210° C. Accordingly, since the soft polyurethane rubber, which is again melted by the hard polyurethane rubber poured and charged into the gap and forms the tire outer portion, and the hard polyurethane rubber have a good affinity and are easily mixed, it is possible to produce the roller provided with the layered synthetic resin tire welded, connected and adhered in a completely integral and inseparable state on the boundary surface with respect to the tire outer peripheral portion due to the formation of the tire base portion. Further, since the tire base portion is formed by the polyurethane rubber having the high melting point of 210° C., there is an effect that the tire base portion is not dissolved even when heat is generated due to using the roller under a high temperature.

The gas generated by the redissolution of the soft synthetic resin on the circular arc-shaped inner peripheral surface of the tire outer peripheral portion moves outward along the circular arc-shaped inner peripheral surface protruding from the inner peripheral surface in the inside direction of the tire outer peripheral portion so as to be charged outward. Accordingly, the boundary surface between the tire outer peripheral portion and the tire base portion can be completely welded.

Since the method of producing the roller, to which the tire is mounted so as to prevent racing, in accordance with the present invention is structured as mentioned above, it is possible to give a suitable cushioning performance to the tire. Further, since the tire base portion formed by the hard synthetic resin is completely integrally welded to the tire outer peripheral portion and the bearing, it is possible to sufficiently satisfy the required performance for an escalator roller which is exposed to high load and requires a high speed rotation performance, abrasion resistance and elasticity. Since the tire structured so that the soft and hard synthetic resins are completely integrally welded is also completely integrally welded to the bearing, the roller can be produced in a comparatively inexpensive manner and by a simple producing step with using no adhesive material. Accordingly, the producing cost can be reduced.

Further, in the roller which is frequently exposed to the high load and stopped for a significantly long time, for example, the escalator and the like, in accordance with the present invention, since the overlaid synthetic resin tire is mounted to the bearing, the tire outer peripheral portion made of the soft synthetic resin gives a suitable cushioning performance to the tire, and the tire base portion made of the hard synthetic resin is completely integrally welded to the tire outer peripheral portion and the bearing, that is, the tire is structured so as to have two layers, one hard and one soft, and the tire is completely welded and fixed to the bearing, so that the tire is not recessed and the tire having the two, hard and soft layers is not peeled even when a high load is applied for a long time.

What is claimed is:

1. The roller comprising:
   a bearing having an inner race and an outer race; and
   a tire mounted on the outer race,
   wherein the outer race of the bearing is formed to have an uneven outer peripheral surface,
   wherein the tire is integrally welded to the uneven outer peripheral surface of the outer race, whereby the tire is immovably fixed to the bearing, and
   wherein the tire includes a tire base portion made of a hard synthetic resin and a tire outer peripheral portion made of a soft synthetic resin, wherein an outer peripheral surface of the tire base portion is formed to have a concave cross-section shape, and wherein the outer peripheral portion of the tire base portion is welded to an inner peripheral surface of the tire outer peripheral portion.

2. The roller as recited in claim 1, wherein the uneven outer peripheral surface of the outer race includes a flat outer peripheral surface and one, or a plurality of, grooves formed thereon.

3. The roller as recited in claim 1, wherein the uneven outer peripheral surface of the outer race includes a flat outer peripheral surface and one, or a plurality of, protrusions formed thereon.

4. The roller as recited in claim 1, wherein the uneven outer peripheral surface of the outer race includes a flat outer peripheral surface and a plurality of grooves formed thereon, and wherein the plurality of grooves are spaced in parallel to each other and extend in an axial direction of the bearing.

5. The roller as recited in claim 1, wherein the uneven outer peripheral surface of the outer race includes a flat outer peripheral surface and a plurality of grooves formed thereon, and wherein the plurality of grooves are spaced in parallel to each other and extend in a spiral manner in an axial direction of the bearing.

6. The roller as recited in claim 1, wherein the uneven outer peripheral surface of the outer race includes a flat outer peripheral surface and a plurality of grooves formed thereon, and wherein the plurality of grooves extend in a spiral manner in an axial direction of the bearing so that the grooves cross each other on the outer peripheral surface of the outer race.

7. The roller as recited in claim 1, wherein the outer race is set to have a thickness obtained by adding a depth of the groove to a thickness of an outer race of a standard bearing in accordance with an international standard.

8. The roller as recited in claim 1, wherein the inner race of the bearing protrudes on one side from a side surface of the tire.

9. The roller as recited in claim 1, wherein the inner race of the bearing protrudes from both of the respective side surfaces of the tire.

10. The roller as recited in claim 1, wherein the tire base portion is at least partially exposed on a side surface of the tire.

11. The roller as recited in claim 1, wherein the tire base portion is formed to have an uneven outer peripheral surface.

12. The roller as recited in claim 1, wherein the tire outer peripheral portion is formed to have an uneven inner peripheral surface.

* * * * *